J. W. SHEARER.

Improvement in Phonetic and Diacritical Notation.

No. 129,600.   Patented July 16, 1872.

129,600

UNITED STATES PATENT OFFICE.

JAMES W. SHEARER, OF MADISON, NORTH CAROLINA.

IMPROVEMENT IN PHONETIC AND DIACRITICAL NOTATIONS.

Specification forming part of Letters Patent No. 129,600, dated July 16, 1872.

*To all whom it may concern:*

Be it known that I, JAMES W. SHEARER, of Madison, in the county of Rockingham and in the State of North Carolina, have invented certain new and useful Improvements in the Phonetic Representation of the Vowel-Sounds of the English Language by Diacritical Notation; and do hereby declare that the following is a full, clear, and exact description thereof, reference being had to the accompanying drawing and to the letters of reference marked thereon making a part of this specification.

The nature of my invention consists, first, in the arrangement, in a system of diacritical notation for the fifteen distinct vowel-sounds of the English language, of certain signs used, respectively, for the different classes of vowel-sounds, by which the said signs, from their position—*i. e.*, their direction relative to the printed line—will represent, in a simple and natural way, the relation of each long to its nearest corresponding short sound; second, in making said signs in outline—*i. e.*, with a hollow type—to represent in a natural way the sounds of vowels in unaccented syllables, in which there is a slight change of quality as well as quantity; and, third, in combination with said signs, short marks or ticks, perpendicular to the centers of said signs, to represent any variation from the regular English sounds.

In order to enable others skilled in the art to which my invention appertains to make and use the same, I will now proceed to describe it, referring to the annexed drawing, in which I have arranged three columns with the fifteen signs in each column.

In the first column, Figure 1 is used with *a* and *e*, as in fate, they. Fig. 2 is used with *e*, *a*, and *u*, as in net, said, bury. Fig. 3 is used with *a* and *e*, as in far, sergeant. Fig. 4 is used with *a*, as in ask. Fig. 5 is used with *a* and *e*, as in fare, there. Fig. 6 is used with *a*, as in fat. These six signs are all *a*-sounds. Figs. 7 and 8 are both *e*-sounds, the former used with *e* and *i*, as in feed, machine, and the latter with *i*, *e*, *o*, *u*, and *y*, as in lip, been, women, busy. Figs. 9, 10, and 11 are *o*-sounds. Fig. 9 used with *o* and *e*, as in note, sew. Fig. 10 is used with *o* and *a*, as in nor, all. Fig. 11 is used with *o* and *a*, as in not, watch. The remaining figures are *u*-sounds. Fig. 12 is used with *u*, *o*, and *w*, as in prune, move, drew. Fig. 13 is used with *u* and *o*, as in full, book, woman. Fig. 14 is used with *e*, *i*, *o*, *u*, and *y*, as in her, sir, word, urge, myrrh. Fig. 15 is used with *u* and *o*, as in but, son.

The short vowel sounds are either perpendicular or oblique to the left, or opening upward or to the left. The long vowel-signs are either horizontal or oblique to the right, or opening downward or to the right. Shade vowel-sounds, not found in English, are represented by short straight marks, called "ticks," drawn perpendicular to the center of the distinct vowel-signs, as shown in the third column in the drawing. By this means the various shades of foreign sounds may be systematically represented, and their relations to the distinct vowel-sounds of the English language clearly indicated.

A "tick" above or on the left of a vowel-sign represents a sound related to but shorter than the English sound; and one placed beneath or on the right represents a sound related to but longer than the English sound. The presence of ticks shows both that the sound is one peculiar to the language, not found in English, and also indicates its position in the scale of vowel-sounds.

Differences have long existed between American and English lexicographers as to the representation of vowel-sounds in unaccented syllables. These have arisen more from the cumbrousness of the systems used than from the difficulties inherent in the thing itself. They are entirely obviated by my system. Since there is a distinct sign for each vowel-sound, that sign made with a hollow type, as shown in the second column of the drawing, will naturally represent the incompleteness, from want of accent, where there is a slight change of quality as well as quantity. When there is only a change of quantity the accent sufficiently indicates it. The sign shows both that a sound is obscured, and what sound is obscured.

Having thus fully described my invention, what I claim as new, and desire to secure by Letters Patent, is—

1. In a system of diacritical notation for the fifteen distinct vowel sounds of the English language, such an arrangement of the signs — and §, .., <, and (, used, respectively, for the different classes of vowel sounds, by which the said signs, from their position or their direction relative to the printed line, represent, in a simple and natural way, the relation of each long to its nearest corresponding short sound, substantially as described and shown in the first column of the drawing.

2. In a system of diacritical notation for the fifteen distinct vowel-sounds of the English language, I claim the said signs made in outline or with a hollow type, as shown in the second column of the drawing, to represent, in a natural way, the sounds of vowels in unaccented syllables in which there is a slight change of quality as well as quantity, substantially as herein set forth.

3. In a system of diacritical notation for the fifteen distinct vowel-sounds of the English language, I claim, in combination with said signs, the use of "ticks" or short straight marks perpendicular to the centers of said signs, as shown in the third column of the drawing, to represent any variation from the regular English sounds, substantially as herein set forth.

In testimony that I claim the foregoing I have hereunto set my hand this 29th day of March, 1872.

JAMES W. SHEARER.

Witnesses:
W. B. CARTER, Jr.,
B. S. ROBERTSON.